United States Patent
Kempf et al.

(10) Patent No.: US 11,336,735 B2
(45) Date of Patent: May 17, 2022

(54) METHOD AND APPARATUS FOR MANAGING SERVICE ACCESS AUTHORIZATION USING SMART CONTRACTS

(71) Applicant: Telefonaktiebolaget LM Ericsson (publ), Stockholm (SE)

(72) Inventors: James Kempf, Mountain View, CA (US); Anshu Shukla, Bangalore (IN); Nanjangud Chandrasekhara Swamy Narendra, Bangalore (IN); Sambit Nayak, Orissa (IN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 119 days.

(21) Appl. No.: 16/965,270

(22) PCT Filed: Feb. 5, 2018

(86) PCT No.: PCT/IB2018/050713
§ 371 (c)(1),
(2) Date: Jul. 27, 2020

(87) PCT Pub. No.: WO2019/150176
PCT Pub. Date: Aug. 8, 2019

(65) Prior Publication Data
US 2021/0075870 A1    Mar. 11, 2021

(51) Int. Cl.
*H04L 29/08*    (2006.01)
*H04L 9/08*    (2006.01)
(Continued)

(52) U.S. Cl.
CPC ............ *H04L 67/16* (2013.01); *H04L 9/0825* (2013.01); *H04L 9/0891* (2013.01); *H04L 9/3247* (2013.01); *H04L 2209/38* (2013.01)

(58) Field of Classification Search
CPC ..... H04L 67/16; H04L 9/0825; H04L 9/0891; H04L 9/3247; H04L 2209/38
See application file for complete search history.

(56) References Cited

U.S. PATENT DOCUMENTS

2008/0244607 A1    10/2008    Rysin et al.
2011/0213712 A1    9/2011    Hadar et al.
(Continued)

FOREIGN PATENT DOCUMENTS

WO    2017/054985 A1    4/2017
WO    2019/130051 A1    7/2019
WO    2019/150176 A1    8/2019

OTHER PUBLICATIONS

Andersen et al., "Democratizing Authority in the Built Environment", Proceedings of The 4th International Conference on Systems for Energy-Efficient Built Environments, BuildSys, ACM, Nov. 8-9, 2017, 10 pages.
(Continued)

*Primary Examiner* — Azizul Choudhury
(74) *Attorney, Agent, or Firm* — Nicholson, De Vos, Webster & Elliott, LLP

(57) ABSTRACT

Methods and systems for authorizing the access of a service are described. A server is operative to receive a request to subscribe to a service. The server is to receive from the requestor a selected service offer from the set of service offers, where the selected service offer is cryptographically signed with the private key of the requestor and the private key of the service. The server is further to record a delegation contract into a blockchain database, where the delegation contract includes an identification of the service, an identification of the requestor, and the service offer that is cryptographically signed with the private keys of the requestor and the service. The server is to transmit, to the requestor, a confirmation that the service can be accessed (Continued)

based on the selected service offer; and transmit to the service the delegation contract causing the service to provide access to the requestor.

21 Claims, 11 Drawing Sheets

(51) Int. Cl.
    *H04L 9/32*         (2006.01)
    *H04L 67/51*       (2022.01)

(56) References Cited

U.S. PATENT DOCUMENTS

| | | | |
|---|---|---|---|
| 2018/0025365 A1* | 1/2018 | Wilkinson | G06Q 30/06 705/7.29 |
| 2018/0314809 A1 | 11/2018 | Mintz et al. | |
| 2019/0058709 A1 | 2/2019 | Kempf et al. | |
| 2019/0372786 A1 | 12/2019 | Ra et al. | |
| 2021/0049846 A1 | 2/2021 | Kashi et al. | |

OTHER PUBLICATIONS

Andersen et al., "Wave: A Decentralized Authorization System for IoT via Blockchain Smart Contracts", Technical Report No. UCB/EECS-2017-234, Dec. 29, 2017, 18 pages.
Arm Limited, "ARM TechCon", IdBrokering_ARM_TechCon_ehakeng_v4.ppt, Hakan Englund, 2017, 5 pages.
Arm TechCon, "Arm TechCon 2017 Schedule", Brokering of IoT Identities, available online at <http://schedule.armtechcon.com/session/brokering-of-iot-identities/850372>, 2017, 3 pages.
Ethereum, "Solidity", available online at < https://solidity.readthedocs.io/en/develop/>, 2016-2017, 5 pages.
JSON, "Introducing JSON", ECMA-404, available online at <https://web.archive.org/web/20200101045049/https://www.json.org/json-en.html>, Jan. 1, 2020, 8 pages.
Marley Gray, "Introducing Project Bletchley", Github, available online at <https://github.com/Azure/azure-blockchain-projects/blob/73148fe77023f7e1303fcceb66800f92862f0035/bletchley/bletchley-whitepaper.md>, Apr. 9, 2017, 17 pages.
Openstack, "Openstack docs: Authorization", available online at <https://docs.openstack.org/security-guide/identity/authorization.html>, Nov. 3, 2017, 4 pages.
U.S. Appl. No. 62/546,225, filed Aug. 16, 2017, 47 pages.
Sawtooth, "Hyperledger Sawtooth documentation: Overview", v0.8 Documentation, Available Online at <https://sawtooth.hyperledger.org/docs/core/releases/0.8.8/>, 2015, 2 pages.
Sebastián Peyrott, "Authentication: Ethereum and Smart Contracts, Part 3", DZone Security, available online at <https://dzone.com/articles/authentication-ethereum-and-smart-contracts-part-3>, Jun. 8, 2017, 6 pages.
U-port, "uPort: Self-Sovereign Identity", available online at <https://www.uport.me>, retrieved on Nov. 3, 2017, 4 pages.
Web3.py, "Web3.py: Contents", 3.16 Documentation, Available Online at <https://web3py.readthedocs.io/en/latest/>, 2017, 2 pages.
Wikipedia, "Uniform Resource Identifier", available online at <https://en.wikipedia.org/wiki/Uniform_Resource_Identifier>, retrieved on Nov. 3, 2017, 9 pages.

* cited by examiner

300

302 {
```
"ComputeService" :
    "RightsDelegation" : {
        "max_number_vms" : 5;
        "max_vm_memory(GB)" : 4;
        "max_vm_cpu_time(hour)" : 3600
},
```

304 {
```
    "ChargingSchedule" : {
        "vm_cpu_time(hour)" : {
            "currency" : "USD",
            "charging-period" : 12,
            "charging-unit" : "hour",
            rate : 0.05
}
}
```

Contract Delegation {

402
```
function Delegation (
        bytes32    grantor,
        string     service_contract,
        bytes32    recipient,
        uint8      subdel,
        unint256   issue,
        unint256   expiry,
        unit256    mySig
        bytes32[]  revokers { }
```

404
```
function isValid()    constant returns(bool valid) {} function isExpired()    constant returns(bool expired) { } function isRevoked()  constant returns(bool revoked) { } function isSuspended()    constant return suspended) { }
function check_chain () constant returns (bool allowed) { }
```

406
```
function suspend() { } function revoke() { } function expire() { }
```

```
┌─────────────────────────────────────────────────────────────────────────┐
│ RECEIVE A REQUEST FROM A REQUESTOR FOR ACCESSING THE SERVICE, WHERE THE │
│ REQUEST INCLUDES A TOKEN DETERMINED AT LEAST IN PART BASED ON A THE     │
│ SERVICE OFFER SIGNED WITH THE PRIVATE KEY OF THE SERVICE AND WITH THE   │
│ PRIVATE KEY OF THE REQUESTOR                                            │
│                                   702                                   │
└─────────────────────────────────────────────────────────────────────────┘
                                     │
                                     ▼
┌─────────────────────────────────────────────────────────────────────────┐
│ DETERMINE THAT THE TOKEN IS VALID INDICATING THAT THE REQUESTOR IS      │
│ AUTHORIZED TO ACCESS THE SERVICE                                        │
│                                   704                                   │
└─────────────────────────────────────────────────────────────────────────┘
                                     │
                                     ▼
┌─────────────────────────────────────────────────────────────────────────┐
│                      GRANT ACCESS TO THE REQUESTOR                      │
│                                   706                                   │
└─────────────────────────────────────────────────────────────────────────┘
```

Figure 7

METHOD AND APPARATUS FOR MANAGING SERVICE ACCESS AUTHORIZATION USING SMART CONTRACTS

CROSS-REFERENCE TO RELATED APPLICATIONS

This application is a National stage of International Application No. PCT/IB2018/050713, filed Feb. 5, 2018, which is hereby incorporated by reference.

TECHNICAL FIELD

Embodiments of the invention relate to the field of data center architecture; and more specifically, to the management of service access authorization using smart contracts.

BACKGROUND

A multi-tenant data center infrastructure supports one or multiple services that are made available to users. The services hosted in a data center can include Infrastructure as a Service (IaaS), which provides access to computing resources (e.g., processing power, data storage capacity, and networking resources). Another example of services can be Platform as a Service (PaaS), which provides a development platform layer (e.g., web servers, database management systems, and software development kits (SDKs) in addition to computing and storage infrastructure. A third example of services can be Software as a Service (SaaS), which provides application-level services tailored to a range of business needs.

A user of the data center can be a tenant (e.g., an external organization with one or more users, or an external individual user) interested in using the services of the cloud based architecture. Additionally, the user can be a service of the architecture that needs to access one or more other services of the cloud based architecture.

The management of tenants and services in data centers is an example of an application where the current state of the art involves mainly in-house solutions deployed and managed by the cloud service provider. Service access authorization is one of the tasks performed by a management system of the cloud computing infrastructure. Existing cloud computing infrastructure management systems may use Role Based Access Control (RBAC) to enable service access. In RBAC the access to the services by a requestor is regulated based on the role assigned to the requestor. In an RBAC system the identity management and authentication system is used to store authorization information, which defines the access rights of a requestor to the service. Authorization tokens, which are utilized in requests (e.g., HTTP requests) from tenants, are stored directly into an identity management database that is managed by the identity management and authentication system. Further, RBAC assigns authorization rights to groups (e.g., the "admin" group can have complete access to the service, while a "user" can have a limited access to the service) and tenants to groups (e.g., a tenant can be an admin or a user, etc.). RBAC mechanisms provide a coarse grained and indirect way to authorize tenants or services to access services.

Attribute Based Authentication (ABAC), where tenants are authorized directly based on attributes granted or delegated to them an authorizing party present another mechanism of enabling service access authorization in a cloud computing infrastructure. However, with ABAC mechanisms ephemeral authorization information is stored into the identity management database, which may result in database bloat.

Existing service access authorization systems don't handle distributed data center deployments well, since they require tenants to have different accounts in geographically distributed data centers, which then need to be federated through a separate mechanism. Existing service access authorization systems require the service provider to trust the provider of the cloud computing infrastructure for performing proper authorization and usage accounting and to handle dispute resolution in a transparent fashion. However, handling service access authorization systems in distributed data centers where multiple parties with competing interests and varying degrees of trust brings several challenges.

SUMMARY

One general aspect includes a method in a server of a data center of enabling service access authorization, the method including: receiving, from a requestor, a request to access a service hosted in the data center, where the requestor is associated with a unique pair of cryptographic private and public keys; determining a set of one or more service offers that can be offered by the service to the requestor, where each one from the set of service offers is cryptographically signed with a private key of the service; receiving from the requestor a selected service offer from the set of service offers, where the selected service offer is cryptographically signed with the private key of the requestor; recording a delegation contract into a blockchain database, where the delegation contract includes an identification of the service, an identification of the requestor, and the selected service offer that is cryptographically signed with the private key of the requestor and with the private key of the service; transmitting to the service the delegation contract as recorded in the blockchain database causing the service to provide access to the requestor based on the selected service offer; and transmitting, to the requestor, a confirmation that the service can be accessed based on the selected service offer.

One general aspect includes a server in a data center for enabling service access authorization, the server including: a non-transitory computer readable medium to store instructions; and a processor coupled with the non-transitory computer readable storage medium to process the stored instructions to receive, from a requestor, a request to access a service hosted in the data center, where the requestor is associated with a unique pair of cryptographic private and public keys; determine a set of one or more service offers that can be offered by the service to the requestor, where each one from the set of service offers is cryptographically signed with a private key of the service; receive from the requestor a selected service offer from the set of service offers, where the selected service offer is cryptographically signed with the private key of the requestor; record a delegation contract into a blockchain database, where the delegation contract includes an identification of the service, an identification of the requestor, and the selected service offer that is cryptographically signed with the private key of the requestor and with the private key of the service; transmit to the service the delegation contract as recorded in the blockchain database causing the service to provide access to the requestor based on the selected service offer;

and transmit to the requestor, a confirmation that the service can be accessed based on the selected service offer.

BRIEF DESCRIPTION OF THE DRAWINGS

The invention may best be understood by referring to the following description and accompanying drawings that are used to illustrate embodiments of the invention. In the drawings:

FIG. 3 illustrates an exemplary service offer that can be offered to a requestor in accordance with some embodiments.

FIG. 4 illustrates an exemplary structure for defining a delegation contract object in accordance with some embodiments.

FIG. 7 illustrates a flow diagram of exemplary operations that can be performed by a service in accordance with some embodiments.

DETAILED DESCRIPTION

Figure 1:
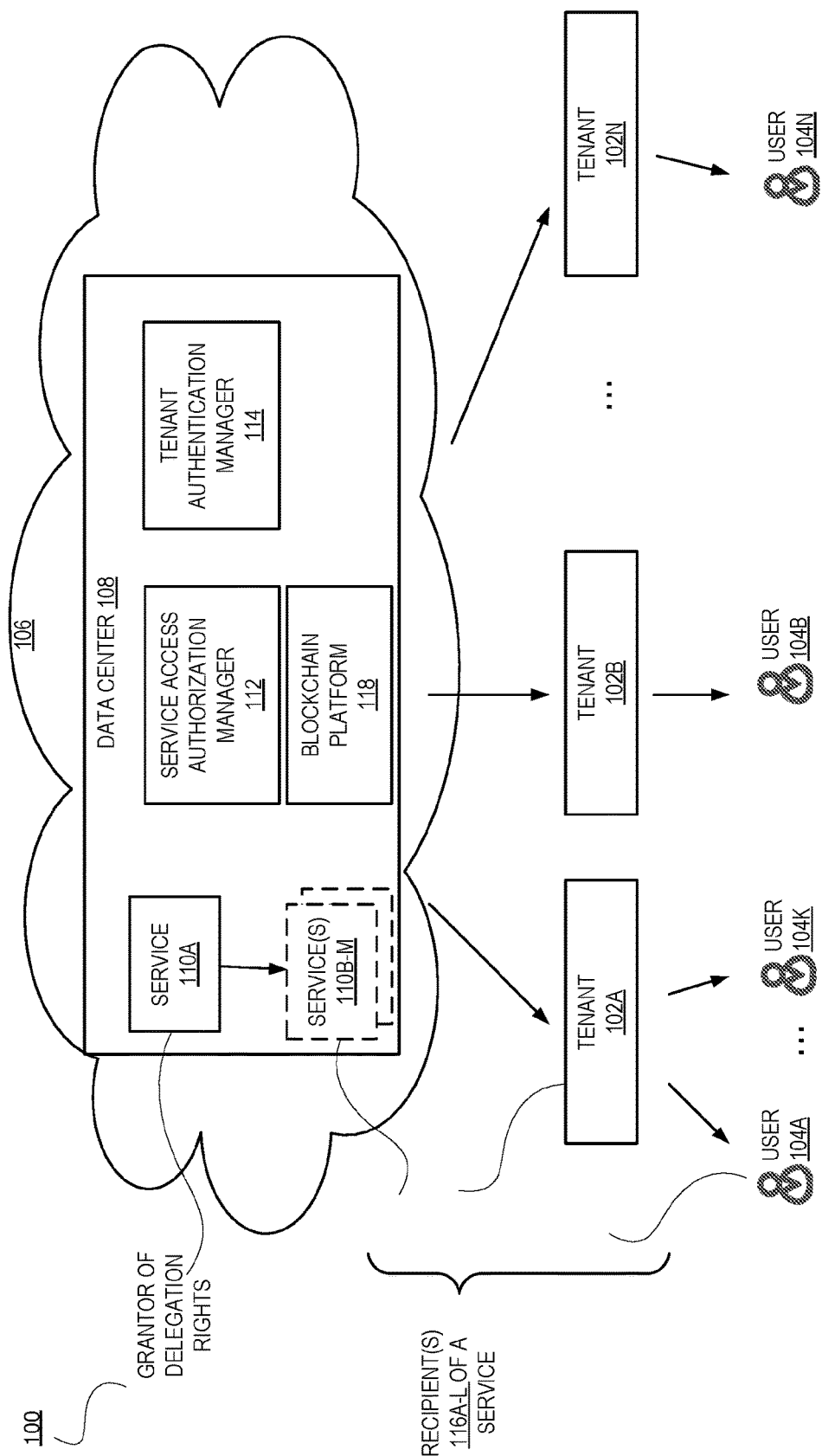
FIG. 1 illustrates a block diagram of an exemplary cloud-based infrastructure in which access authorization of cloud-based services can be performed, in accordance with some embodiments.

The following description describes methods and apparatus for enabling service authorization using smart contracts in a data center. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

A blockchain system is a platform used for building, running, and deploying a distributed ledger. The distributed ledger permanently records, and in a verifiable way, digital records of transactions that occur between two parties. The distributed ledger is maintained without a central authority or implementation. The distributed ledger is referred to as a blockchain database that includes blocks, which are linked and secured using cryptography.

The embodiments described herein provides mechanisms for providing service access authorization based on smart contracts. In the solution presented herein, instead of authorization tokens as it is the case in prior art technique, smart contracts established between a requestor and a service are recorded into a blockchain database. A requestor's right to use a service is represented as a delegation of rights from the service to the requestor. In some embodiments, the requestor is further authorized to sub-delegate its right of use of the service to other users. The delegation of right is recorded as a smart contract (herein referred to as a delegation contract) on the blockchain database. The delegation contract includes an identification of the requestor, an identification of the service and a service offer that is agreed upon between the requestor and the service. In these embodiments, the generation of web tokens that are to be used for allowing the requestor to access the service via a web platform is handled by the service once the delegation contract has been recorded.

The embodiments describe methods and systems for authorizing the access of a service to a requestor and for revoking this access. In one exemplary embodiment, a server of a data center is operative to receive, from a requestor, a request to subscribe to a service hosted on the data center. The requestor is associated with a unique pair of cryptographic private and public keys. The server is to determine a set of one or more service offers that can be offered by the service to the requestor; and is to receive from the requestor a selected service offer from the set of service offers, where the selected service offer is cryptographically signed with the private key of the requestor and the private key of the service. The server is further to record a delegation contract into a blockchain database, where the delegation contract includes an identification of the service, an identification of the requestor, and the selected service offer that is cryptographically signed with the private key of the requestor. The server is then to transmit, to the requestor, a confirmation that the service can be accessed based on the selected service offer; and transmit to the service the delegation contract as recorded in the blockchain database causing the service to provide access to the requestor based on the selected service offer.

The techniques presented herein separates the authorization of the delegation rights from the actual access of the service. This enables an increased flexibility in the choice of access technology that can be made by different services (e.g., each service can select a proper web token format to use upon receiving a request from a requestor). In some embodiments, the blockchain platform used for recording delegation contracts provides a permissioned, distributed ledger, any party with credentials to read and write from the blockchain database can participate in the authorization mechanism, naturally extending the authorization mechanism to distributed cloud infrastructures with multiple parties without the need for any additional mechanism. The embodiments presented herein allow for a clean separation of right delegation (i.e., access authorization) and revocation and from identity management and authentication.

FIG. 1 illustrates a block diagram of an exemplary cloud-based infrastructure 100 in which access authorization of cloud-based services can be performed, in accordance with some embodiments. The exemplary cloud-based architecture may include one or more data centers 108 disposed in a cloud operator network 106 that may be configured to offer a variety of resources and services to multiple tenants (i.e., multi-tenancy) pursuant to suitable service level agreements, service management contracts, and so on.

A tenant, for the purposes of the present disclosure, may be understood as a person, organization, business entity, or a group of users, that desires to enroll with the cloud operator or provider for accessing a specific set of resources/services under particular authentication/authorization credentials, privileges, constraints, and/or policy-based business rules.

By way of illustration, a plurality of tenant entities 102A to 102N exemplified in FIG. 1 may comprise corporate, commercial or governmental organizations, a private person or a group of persons, that may request and consume one or more services 110A-M hosted by the cloud-based data center 108 via one or more electronic devices in tenant premises disposed in tethered (wired) or untethered (wireless) network environments. Each of the tenant 102A-N may have one or more users 104A-104K, 104B, and 104N that can, using an electronic device in a tenant premise, request and access one or more services of the data center 108. The users 104 can be employees of an organization, a private individual, customers of an organizations, etc. As will be described in further details below, each user can have a different level of access rights for accessing one or more of the services 110. In some embodiments, tenants and services are represented in the data center 108 via contract accounts. For tenants, each account specifies the identity of the tenant (e.g., with unique identification of the tenant (e.g., the tenant's public key and contact information such as an email address, a phone number or the like)) and charging credentials for settlement upon usage of one or more services.

As such, example tenant entities 102A-102N may span across various types of businesses and industries, and may consume one or more resources/services including, without limitation, cloud storage resources, processor compute resources, network bandwidth resources, load balancing services, virtualized network infrastructure resources, Software as a Service (SaaS) services, Platform as a Service (PaaS) services, Infrastructure as a Service (IaaS) services, streaming media services, voice telephony/VoIP services, and one or more inline services such as, e.g., Deep Packet Inspection (DPI) services, Virus Scanning (VS) services, Intrusion Detection and Prevention (IDP) services, Firewall (FW) filtering services and Network Address Translation (NAT) services, and the like.

Broadly, with a multitenant architecture, the data center 108 may be arranged to provide every tenant a dedicated or configurable share of a resource/service including its data, configuration, user management, tenant individual functionality as well as properties such as security, charging, etc.

At a macro level, the data center 108 may be implemented in a hierarchically interconnected system of multiple nodes including appropriate compute, storage and network elements disposed in a wide area backbone (e.g., IP or Next Generation Network (NGN)), to which a tenant premises equipment or subscriber end station may have secure Internet access. In one embodiment, a tenant premise can have its own compute resources logically separated from the cloud-based services 110. In another arrangement, a tenant's private cloud may be accessed remotely via suitable Secure Sockets Layer (SSL) or IPSec VPN connections. Regardless of a particular multitenant architecture, example data center 108 may be organized based on a multi-layer hierarchical network model which may in general include three layers of hierarchy: a core layer (typically characterized by a high degree of redundancy and bandwidth capacity, optimized for high availability and performance), an aggregation layer that may be characterized by a high degree of high-bandwidth port density capacity (optimized for traffic distribution and link fan-out capabilities to access layer switches, and an access layer serving to connect host/server nodes to the network infrastructure.

From the perspective of a functional model, exemplary data center 108 may be comprised of the following layers: (i) network layer, (ii) services layer, (iii) compute layer, (iv) storage layer, and (v) management layer. Skilled artisans will recognize that with respect to the services layer there can be a difference between a conventional data center services layer and the cloud-based data center services layer in that the functional reference model of the cloud-based data center services layer may be architected for supporting application of L4-L7 services at a per-tenant level, e.g., through logical abstraction of the physical resources including hardware and software resources. Even with L4-L7 integrated services being provided, a cloudbased data center services layer may be configured to implement centralized services which may be more useful in applying policies that are broadly applicable across a range of tenants (or across different workgroups within a tenant premises network). An example management layer of the data center 108 may be architected as a set of logical, functional and structural resources used to support and manage the overall multi-tenant architecture, including domain element management systems as well as higher level service orchestration systems, preferably configured to executing various data center administration functions regarding storage, compute, and network resources, including elements which allow for more dynamic resource allocation and automated processes (i.e., instantiating administrative or tenant user portals, service catalogs, workflow automation, tenant lifecycle management, scripting smart contracts, and the like). In one embodiment, a service access authorization manager 112 may therefore be implemented as a "superset" or "backend" functionality of the data center 108 in connection with the hosted resources/services 110 configured to serve the plurality of tenants 102A to 102N for purposes of an example embodiment of the present invention as it will be described in further detail below.

The data center 108 (which is also referred to herein as the data center 108) includes the service access authorization manager 112, a tenant authentication manager 114, and a blockchain platform 118. While the blockchain platform 118 is illustrated as being part of the data center 108, in some embodiments, the blockchain platform 118 ca be located in one or more other data centers that are communicatively coupled with the data center 108. The service access authorization manager 112 is operative to expose a communication interface (e.g., using a Representational state transfer (REST) Application Programming interface (API) formulated through Hypertext Transfer Protocol (HTTP) requests) for use by the tenants 102A-N and/or the services 110A-M to request and obtain access to one or more of the services 110A-M. The services access authorization manager 112 provides a mechanism for authorizing tenants and services to have access to particular service offer(s) of a service for a determined period of time. The data center 108 further includes a tenant authentication manager 114 that is operative to identify tenants and authenticate that a particular communicating entity corresponds to a tenant that previously established its identity with the system.

As will be described in further details below, the data center 108 is operative to enable service access authorization to tenants and/or services based on smart contracts recorded on a permissioned, distributed ledger (aka a blockchain) through the blockchain platform 118. The service access authorization manager 112 is operative to generate custom delegation contracts for particular classes of users and types of payment credentials and to delegate authorization for the use of service attributes to tenants, sub-tenants and other services.

In some implementations, the service access authorization manager 112 may be built on an open source distributed ledger and smart contract platform (e.g., Quorum™). The service access authorization manager 112 functions as a DApp—that is, a blockchain-based, distributed application—on top of an open source distributed ledger. It accesses the blockchain database and interacts with smart contract objects stored in the blockchain database. In some embodiments, the service access authorization manager 112 runs on a server in the data center 108. For example, each server in a particular server cluster of the data center 108 (rack, rack row, etc.) may have an instance of the service access authorization manager 112 as well as an instance of the blockchain platform 118 running on it, thus forming the blockchain and the tenant/service management platform. In some embodiments, data center instance management mechanisms may be used to confine the service access authorization manager 112 instances to specific servers, reducing the overhead.

In the following description operations will be described between the service access authorization manager 112, an exemplary requestor 120, and an exemplary service 110A by way of example and in the interest of simplifying the description below. One of ordinary skill in the art would recognize that these operations can be performed between other entities in the data center 108 without departing from the scope of the present invention.

Figure 2A:
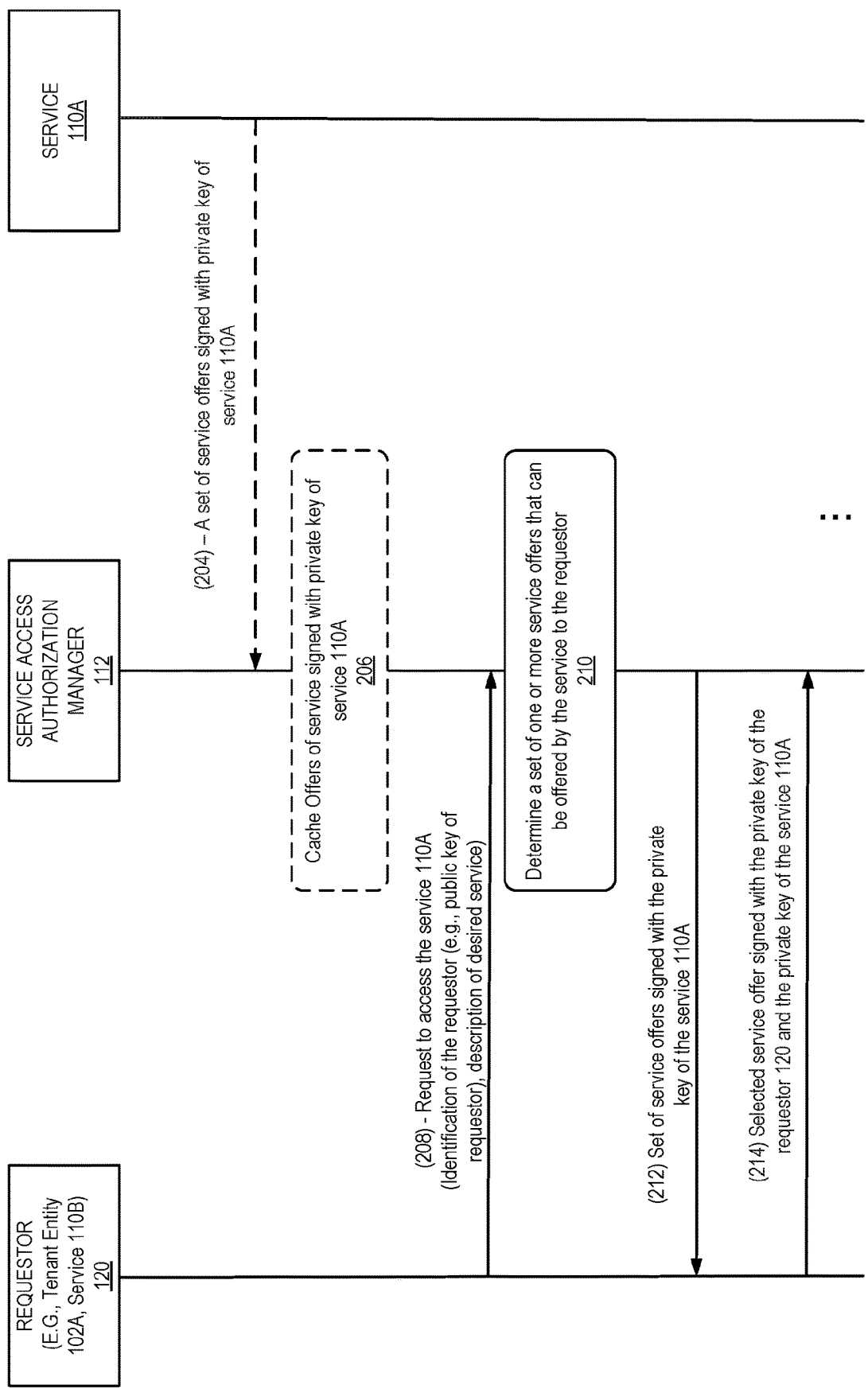
FIG. 2A illustrates a block diagram of exemplary operations for authorizing access to a service in accordance with some embodiments.
Figure 2B:
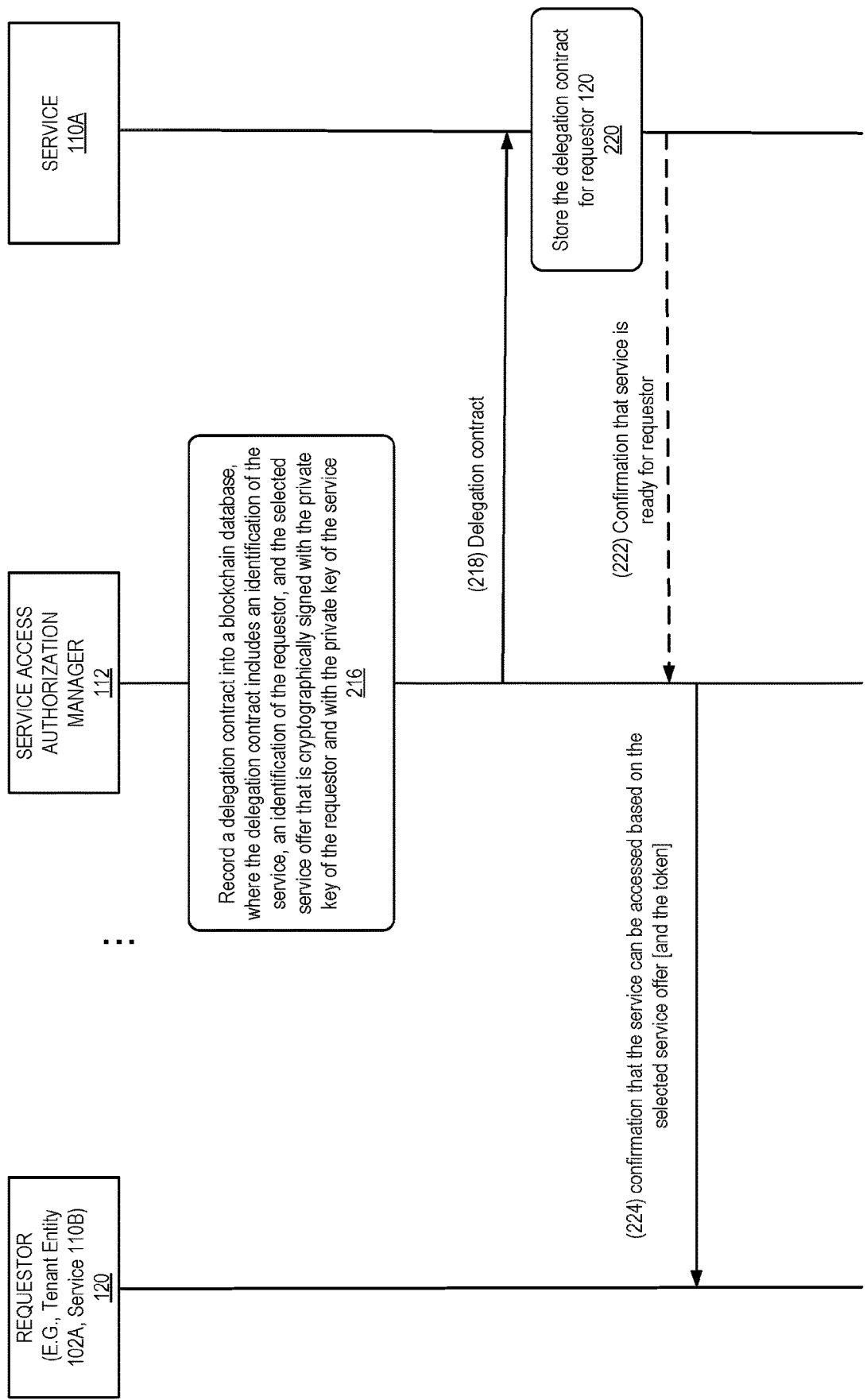
FIG. 2B illustrates a block diagram of exemplary operations performed to further enable service access authorization in accordance with some embodiments.

FIG. 2A illustrates a block diagram of exemplary operations for authorizing access to a service in accordance with some embodiments. In some embodiments, the operations of FIGS. 2A-2B illustrating an exemplary authorization process to enable access of the service 110A by the requestor 120 are performed when the requestor attempts to create an account with the data center 108 or alternatively when attempting to subscribe to the service 110A. In the following description, the service access authorization manager 112 represents a tenant's or service's rights delegation as a smart contract of type delegation (which is referred to herein as a delegation contract). In some embodiments, communications between the requestor 120, the service access authorization manager 112 and the service 110A can be a REST API messages formulated as HTTP messages.

At operation 204, a set of service offers are received from the service 110A. Each service offer is signed with a private key of the service 110A. A service offer may include a description of service attributes defining the service that is to be offered. For example, a service offer may include quotas specifying the maximum amount of the service attributes that can be consumed by the requestor. In some embodiments, the service offer may also include charging schedules for the service attributes indicating how the requestor is to be charged for using the service as indicated in the service offer. Each service offer may be formatted in a language-independent file format such as a JavaScript Object Notation (JSON) document. Other formats can be used to define the service offer without departing from the scope of the present invention. In some embodiments, the service offers sent to the service access authorization manager 112 can depend from the type of tenant to which they can be offered.

FIG. 3 illustrates an exemplary service offer that can be offered to a requestor in accordance with some embodiments. The service offer includes a first part 302 that defines the type of service that is to be offered, and a second part 204 that defines the charging schedule for this service offer. In the illustrated example, a service offer 300 specifies a grant of rights from the ComputeService for up to 5 virtual machines (VMs) with a maximum per VM memory of 4 GB and a maximum per VM CPU time of 3600 hours. The charging of VM CPU time in hours is done every 12 hours at the rate of 0.05 US Dollars per hour. The service offer of FIG. 3 is intended to be exemplary only and should not be regarded as a limiting example of the embodiments described herein. Several types of offers can be defined and transmitted to the service access authorization manager 112 without departing from the scope of the present invention.

Referring back to FIG. 2A, in some embodiments, the service access authorization manager 112 may cache (operation 206) the offers of service received from the service 110A as signed with the private key of the service 110A. In other embodiments, the set of service offers are used upon being received without the need for caching them. While in the illustrated example, the receipt of these service offers (204) is performed prior to the receipt of a request from the requestor 120, in other embodiments, this operation is performed after the request to access the service 110A is received from the requestor 120.

At operation 208, the service access authorization manager 112 receives, from a requestor, a request to access a service hosted in the data center 108. The requestor is associated with a unique pair of cryptographic private and public keys. The requestor can be a tenant or a service from the services 110.

At operation 210, the service access authorization manager 112 determines a set of one or more service offers that can be offered by the service to the requestor. In one embodiments, determining the set of service offers includes retrieving from a cache the set of one or more service offers. The set of service offers were obtained from the service and are signed with a private key of the service (e.g., through operations 204-206).

At operation 212, the service access authorization manager 112 transmits the set of service offers signed by the service to the requestor 120. In some embodiments, the service access authorization manager 112 may display (operation 212) a graphical user interface (e.g., a web page on a web browser) including the service offers. The requestor 120 selects one of these offers (e.g., a user may select through the web page displayed on an electronic device in the tenant premises, a desired service from a list of services that are offered). The service access authorization manager 112 receives, at operation 214, from the requestor a selected service offer from the set of service offers. The selected service offer is cryptographically signed with the private key of the requestor and with the private key of the service 110A. The signature is stored by the requestor and is used for accessing the service 110A. In some embodiments, the signature resulting from the service offer being signed by the keys of the service and the requestor may be put into a JSON Web Token (JWT), which is a base 64 encoded copy of the JSON document containing the service offer. The JWT including the signature is stored by the requestor and is used for accessing the service 110A.

FIG. 2B illustrates a block diagram of operations performed to further enable service access authorization in accordance with some embodiments. Once the service access authorization manager 112 receives the selected service offer from the requestor 120, it records a delegation contract into a blockchain database, at operation 216. The delegation contract includes an identification of the service, an identification of the requestor, and the selected service offer that is cryptographically signed with the private key of the requestor and with the private key of the service.

FIG. 4 illustrates an exemplary structure for defining a delegation contract object in accordance with some embodiments. The delegation contract structure 400 is illustrated as way of example as defined with a contract-oriented programming language (that is typically used for writing smart contracts) such as the Solidity API. Other types of programming languages can be used for defining the delegation contract structure 400 without departing from the scope of the present invention. The structure 400 defines a contract of type delegation that can be used to generate delegation contracts between a service (the service 110A) and a requestor (e.g., tenant 102A).

The structure 400 includes several parameters 402. The parameters 402 includes a grantor and a recipient parameter for respectively including an identification of the service (which is to grant services to a requestor) and an identification of the requestor (which is to receive the granted services, the requestor may be referred to as the "recipient" of the service, once the service is granted). In some embodiments, the identification of the service (grantor parameter) includes the registered public key of the entity granting the delegation rights for using the service (i.e., the public key of the service). In these embodiments, the identification of the requestor (recipient parameter) includes the registered public key of the entity receiving the delegation rights for using the service (i.e., the public key of the requestor). Each entity that is to be engage is the delegation contract (i.e., the requestor or the service) has a pair of cryptographic keys: a public key which may be disseminated widely, and a private key which is known only to the owner. Several known cryptographic systems of public key cryptography can be used to determine the pair of public/private key for an entity (i.e., a requestor or a service) without departing from the scope of the present invention.

The parameters 402 further include a "service_contract" parameter, which is the service offer selected by the requestor from a set of service offers that can be offered by the service. Thus the "service contract" defines a set of delegated rights which the grantor (i.e., the service) is granting to the recipient (i.e., the requestor) for using the service. The service_contract includes one or more attributes that define the type of service that is to be offered. The attributes may be determined based on the type of the requestor and the service. For example, different attributes can be set when the service is a SaaP or when the service is a video streaming service. In another example, for a same service, a different set of attributes and rights can be delegated to different users (e.g., a user of a CRM platform may have different delegation rights (hence different attributes) than a developer of the same CRM platform).

In some embodiments, the service_contract can also include charging schedule information, which defines how the recipient of the service is to be charged when using the service according to the selected service offer. The service contract constitutes the description of the business agreement between the grantor (e.g., the service 110A) and the recipient (i.e., e.g., the requestor 120) as to what is granted by the grantor and what the recipient will pay for that grant. In some embodiments, the service_contract parameter may be formatted in a language-independent file format such as a JavaScript Object Notation (JSON) document. Other formats can be used to define the "service_contract" without departing from the scope of the present invention. FIG. 3 illustrates a non-limiting example of "service_contract" that can be agreed upon between a requestor and a service.

The parameters 402 a signature "MySig" of the service offer. The service offer is successively signed by the service and by the requestor allowing to authenticate the service offer as agreed upon by both parties. The resulting signature is added to the delegation contract as a parameter "MySig." In some embodiments, MySig is a JSON Web Token (JWT) that includes the signature.

The parameters 402 further include the "issue" and "expiry" parameters, which respectively indicate the time the delegation contract was issued and the time the delegation contract expires. The time may include a date and a time. An example of expiration time is: 13:0:0-GMT-July-1-2018, which indicates that a given delegation contract is to expire at 13:00 hours GMT on Jul. 1, 2018. In some embodiments, a delegation contract is implicitly suspended when it expires. The parameters 402 also includes parameters "subdel" and revokers which respectively indicate the number of allowed sub-delegations (i.e., the number of sub-tenants that the requestor can delegate the contract to) and the identifications of one or more entities that are authorized to revoke the delegation contract. In some embodiments, the identification of the delegation revokers can be the public cryptographic keys of these entities.

In some embodiments, instead of or in addition to the number of allowed sub-delegations, the parameters can also include identifiers of entities to which the delegation contract can be sub-delegated. For example, when the requestor is an organization that has several users, when a first delegation contract is generated for the organization (e.g., a plumbing company) and a given service (e.g., a database service), the administrator (e.g., the owner of the company) of the organization is authorized to access the service. The delegation contract may include a number and/or identifiers of one or more employees (e.g., one or more plumbers) of the organization to which access to the service can be granted as well. The administrator of the organization by way of the established delegation contract may sub-delegates rights to use the service as indicated in the "subdel" parameters of the created delegation contract. When a delegation contract is created as a result of a sub-delegation from a requestor to a sub-tenant, it is stored in the blockchain database in a chained manner. In this way, the delegation contracts form a lattice grounded in the services provided by the data center hardware infrastructure resources. For example, with reference to FIG. 1, the data center 108 may delegate rights to use its physical infrastructure (e.g., computing, storage, and network resources) to the services 110A-M and/or directly to the tenants 102A-N. A service (e.g., service 110A) can delegate access rights to sub-delegates, such as the services 110B-M. The services 110A-M also sub-delegate rights to tenants 102A-N Similarly, a tenant organization (e.g., a small business owner running an automobile repair shop) receives the sub-delegation and may further sub-delegate the access rights to employees, providing them with access to the services and the data center 108.

The structure 400 further includes a set of operations 404 and 406 that can be performed on a delegation contract once created. The functions 404 includes provide means for determining a state of the delegation contract. For example, the function "isValid" when run on a delegation contract enables the determination of whether the delegation contract is valid or not. In another example, the function "isExpired" when run on a delegation contract enables the determination of whether the delegation contract has expired or not. The function "isReboked" when run on a delegation contract enables the determination of whether the delegation contract has been revoked or not. The function "isSuspended" when run on a delegation contract enables the determination of whether the delegation contract has been suspended or not. The function "check_chain" when run on a delegation contract enables the determination of whether the chain of sub-delegation leading to the current delegation contract is allowed or not.

The functions 406 includes a set of operations that can be performed on a delegation contract that can modify the state of the delegation contract. For example, the function "suspend" enable the suspension of a delegation contract. The function "revoke" enable the revocation of a delegation contract. The function "expire" forces the expiration of a delegation contract prior to the expiry time being reached. The structure 400 is presented as an exemplary implementation and is not to be regarded as a limiting example of delegation contract. Other types of parameters and/or functions can be defined in addition or alternatively to the ones illustrated in FIG. 4 without departing from the scope of the present invention.

Returning to FIG. 2B, once the delegation contract is recorded in the blockchain database (e.g., through the blockchain platform 118), the service access authorization manager 112 transmits, at operation 218, to the service 110A the delegation contract as recorded in the blockchain database causing the service to provide access to the requestor based on the selected service offer. At operation 220, the service 110A stores the delegation contract as received from the service access authorization manager 112 for the requestor 120. In some embodiments, the service 110A may transmit, at operation 220, a confirmation that it is ready to process requests from the requestor 120 upon receiving (or the storing) of the delegation contract. In other embodiments, the service 110A does not send the confirmation. At operation 224, the service access authorization manager 112 transmits, to the requestor, a confirmation that the service can be accessed based on the selected service offer. In some embodiments, the confirmation includes a cryptographic token (signature of the service offer with the private key of the service and the private key of the requestor) that enables the requestor to access the service. For example, the token can be a JWT. Upon receipt of the confirmation, the requestor 120 may initiate the use of the service 110A.

Figure 2C:
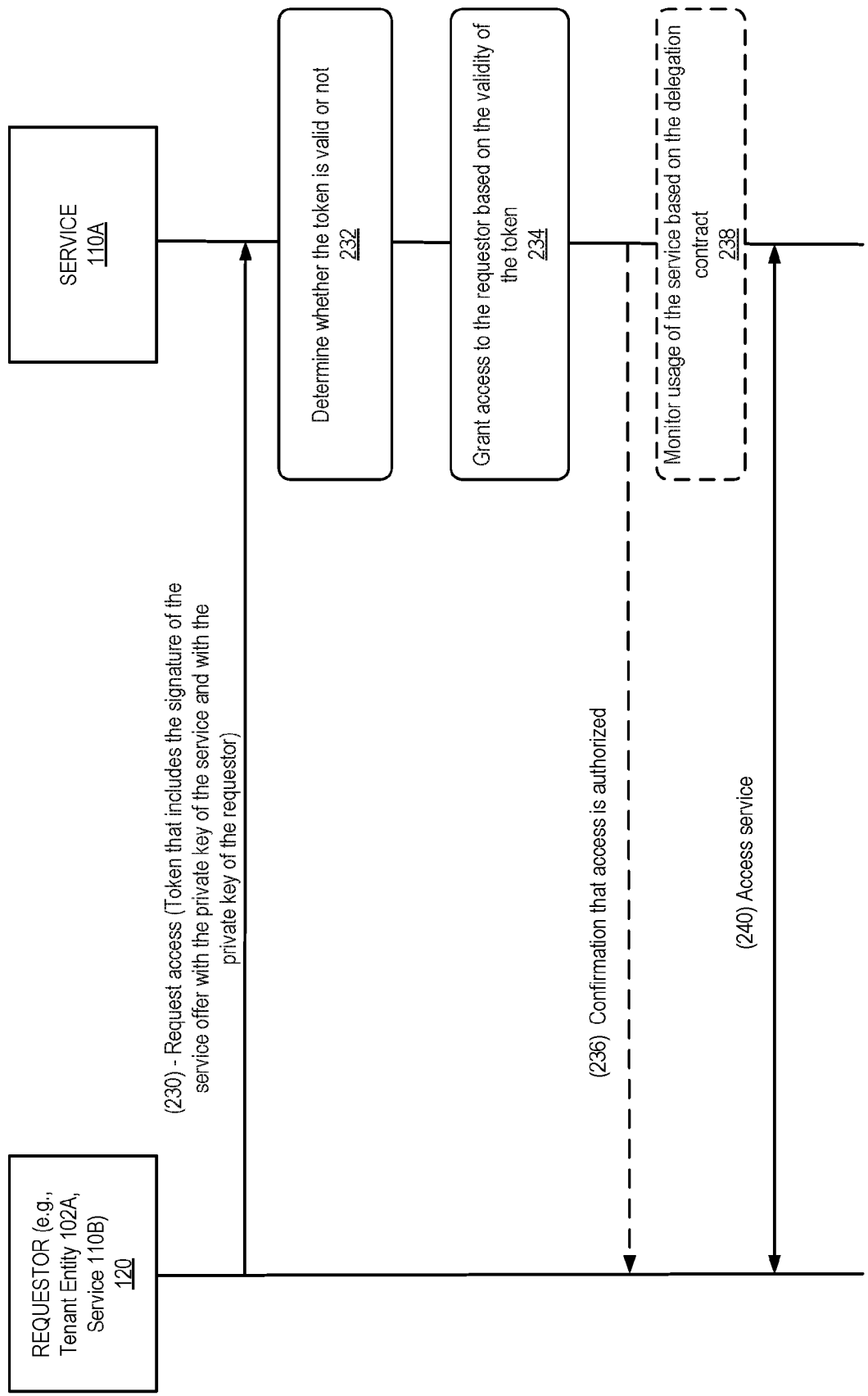
FIG. 2C illustrates a block diagram of exemplary operations for accessing the service based on a delegation contract between a requestor and a service in accordance with some embodiment.

FIG. 2C illustrates exemplary operations for accessing the service based on a delegation contract between a requestor and a service in accordance with some embodiment. Following the receipt of a confirmation that the service can be accessed, the requestor transmits a request to access the service (operation 230). The request includes an identification of the requestor (e.g., the public key of the requestor). In some embodiments, the request also includes an identification of the delegation contract. At operation 232, the service 110A determines, based on the identification of the requestor and the delegation contract associated with the requestor, that the requestor is authorized to access the service. The service 110A retrieves based on the identification of the requestor and/or the identification of the delegation contract, the delegation contract stored (at operation 220) and which defines the attributes of the service offer selected and agreed upon between the service and the requestor. Upon determining that the delegation contract is still valid (i.e., it has not expired, it has not been invalidated, it has not been revoked, etc.), the service 110A grants access to the requestor based on the service offer defined in the delegation contract, at operation 234. At operation 236, the service 110A may transmit to the requestor 120 a confirmation that access is authorized. In some embodiments, access is provided to the service without the need of transmitting the confirmation. At operation 240, the requestor starts using the service. In some embodiments, in addition to providing access to the requestor the service 110A may monitor the usage of the service by the requestor 120 based on the attributes of the service offer and may determine how to charge the requestor (which is now considered a recipient of the service) for the usage of the service. The service 110A may also monitor whether quotas allowed by the service offer are reached, unused or exceeded.

The use of service access authentication techniques based on smart contract infrastructures that enable the creation and recordation of a delegation contract between a requestor of a service and the service that is provided allows for increased scalability and resilience, and enable the participation of multiple parties (e.g., the cloud infrastructure, the service providers built on top of the cloud infrastructure, tenants (e.g., organizations) and sub-tenants (e.g., employees, customers) in complex business ecosystems. Further authentication of the terms of the contract is enabled by having both parties sign the service offer with their private cryptographic key. The embodiments herein provide a significant advantage over other technique where a centralized database can store access information by relying on the immutable aspect of the blockchain database storing the contract Immutability of the delegation contracts means that in case of a dispute, the blockchain database can be audited by a third party to determine what actually happened and what was agreed upon between the requestor and the service at the time of the service being requested. Regulators, auditors, and mediators can be given permission for read-only access to the blockchain database in order to monitor and audit the activity. Industries which are heavily regulated, like financial services and health care, especially benefit from such an immutable system. In addition, blockchains are particularly well suited to cases where multiple parties form a business ecosystem in which they cooperate in some cases and compete in others. In some embodiments, the service access authentication manager is run by the cloud provider as part of the cloud management system. While the embodiments were described with reference to a service access authentication manager being part of the management system of the cloud computing infrastructure, other entities may use the techniques described herein to generate and store delegation contracts between a service and a requestor in a blockchain database.

Distributed clouds, where multiple independent data center operators collectively provide compute, network and storage service, can greatly benefit from using a tenant and service management system based on a permissioned, distributed ledger such as the service access authorization manager 112. If the data center operators run independent management systems based on a centralized database, then they need to federate the authorization systems and proceed through a centralized management system. With a blockchain platform, each data center operator has permission to access the blockchain database, and record use for tenants from other operators, without the need for complicated authentication protocols or a settlement intermediary, considerably reducing the amount of friction in setting up a federation. Tenants and services also have one set of credentials that allows them to access any data center in the consortium without requiring multiple accounts and complex, single sign-on protocols.

Once access to a service is granted to a requestor and the requestor becomes a recipient of the service, the access can be revoked. To cancel access to the service, the delegation contract created between the requestor and the service is revoked or suspended. There are two situations in which a delegation contract can be suspended or revoked: 1) expiration of the validity time period (i.e., when the expiry time is reached), or 2) through intervention of a revoker as indicated in the delegation chain. The revoker may determine to revoke or suspend the service due to multiple reasons (e.g., lack or resources, failure of a charging transaction, etc.). In some embodiments, the service access authorization manager 112 may suspend the delegation contract before revoking it. In these embodiments, the suspension may allow the requestor (e.g., a tenant or service owner) an opportunity to pursue a restoration procedure with the service provider prior to losing rights to the grant entirely. In other example, the service access authorization manager 112 may revoke the delegation contract directly without suspending it before.

Figure 5:
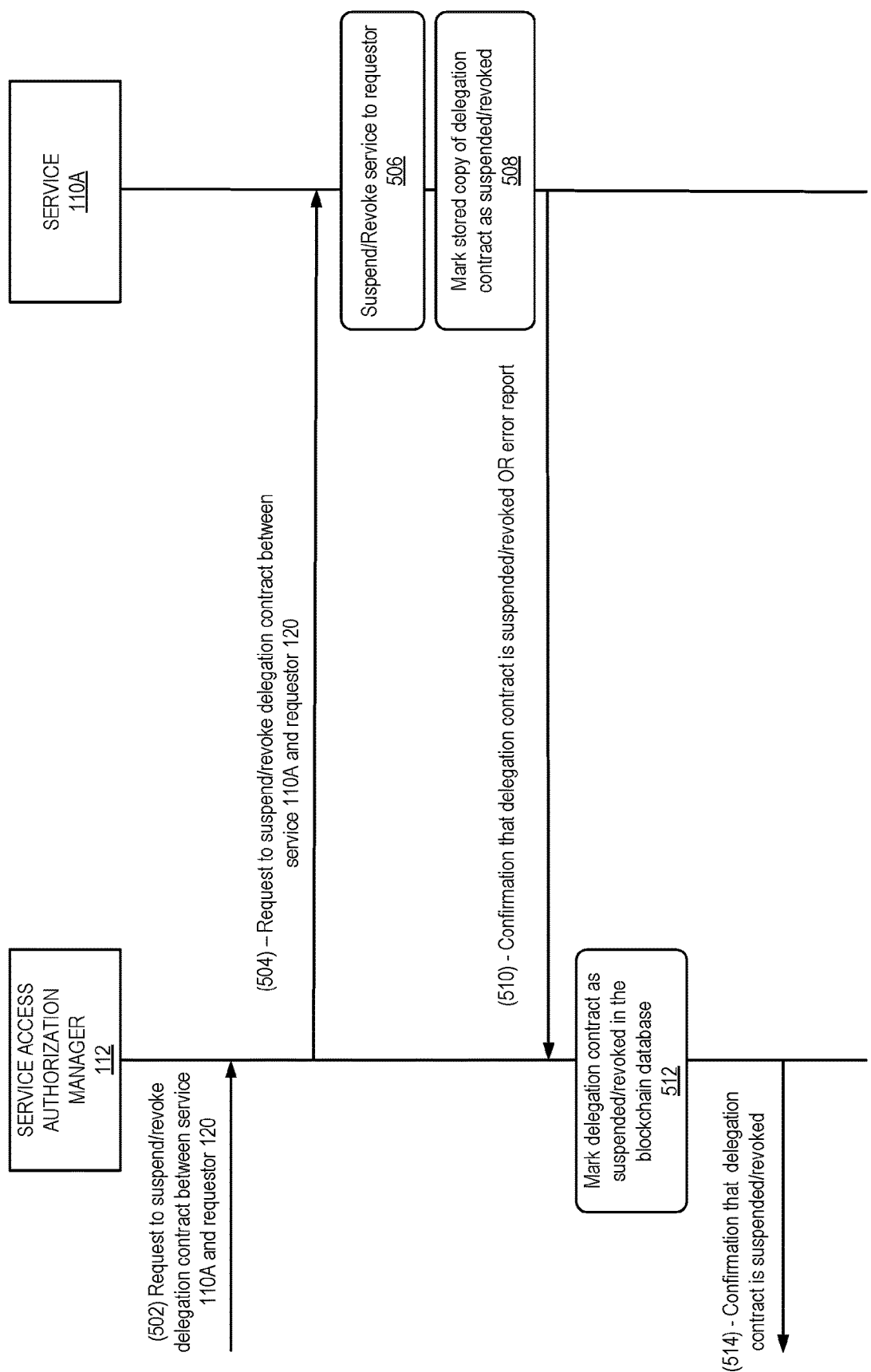
FIG. 5 illustrates a block diagram of exemplary operations for revoking a service access to requestor.

FIG. 5 illustrates a block diagram of exemplary operations for revoking a service access to requestor. At operation 502, a request is received at the service access authorization manager 112 from an authorized revoker (i.e. from an entity with a revoker contract in the delegation chain) to suspend or revoke the delegation contract established between the requestor 120 and the service 110A. At operation 504, the service access authorization manager 112 transmits the request to suspend or revoke the delegation contract to the service 110A. Upon receipt of the request, the service 110A which suspends or revokes the requestor's access to the service (for example suspending VMs or locking a tenant out of access to their storage volumes). At operation 508, the service 110A marks its cached copy of the rights delegation as suspended or revoked depending on the action that has been performed. The service 110A transmits the results of the operation to the service access authorization manager 112. The transmitted message can include a confirmation that the delegation contract is successfully revoked or suspended or alternatively a error report indicating that the operation was not successfully performed. When the operation (suspension or revocation) is successful, the service access authorization manager 112 marks (operation 512) the delegation contract as suspended in the blockchain database (e.g., through an operation on the delegation contract in the blockchain platform) and transmits at operation 514, to the revoker a confirmation that the delegation contract was suspended or revoked.

In some embodiments, revocation occurs if the tenant or service owner doesn't pursue a restoration action within a specified period of time or if a tenant or service owner deletes their account with the service access authorization manager 112. Full revocation of the delegation contract (i.e., of the access rights granted to a requestor) results in the transfer of the rights back to the original grantor of the delegation. This could be a service or a tenant that has sub-delegated rights. In a non-limiting example, a grantor (e.g., service 110A) of a delegation D can be at level K in the delegation chain (i.e., K levels below the original grantor), and the recipient (e.g., the requestor 120) is at level K+M in the chain (M>0). When the delegation D is suspended or revoked, all delegations at level K+M and below in the delegation chain of D will be suspended. If the grant is revoked, grants in D reverts back to the grantor of D at level K+M−1. If that grantor sourced such rights grants of D from any delegations that it itself possesses, then those delegations would have been the source delegations of D in the chain, and thus this effectively amounts to the corresponding rights grants of D getting back to those source delegations.

The operations in the flow diagrams will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

Figure 6:
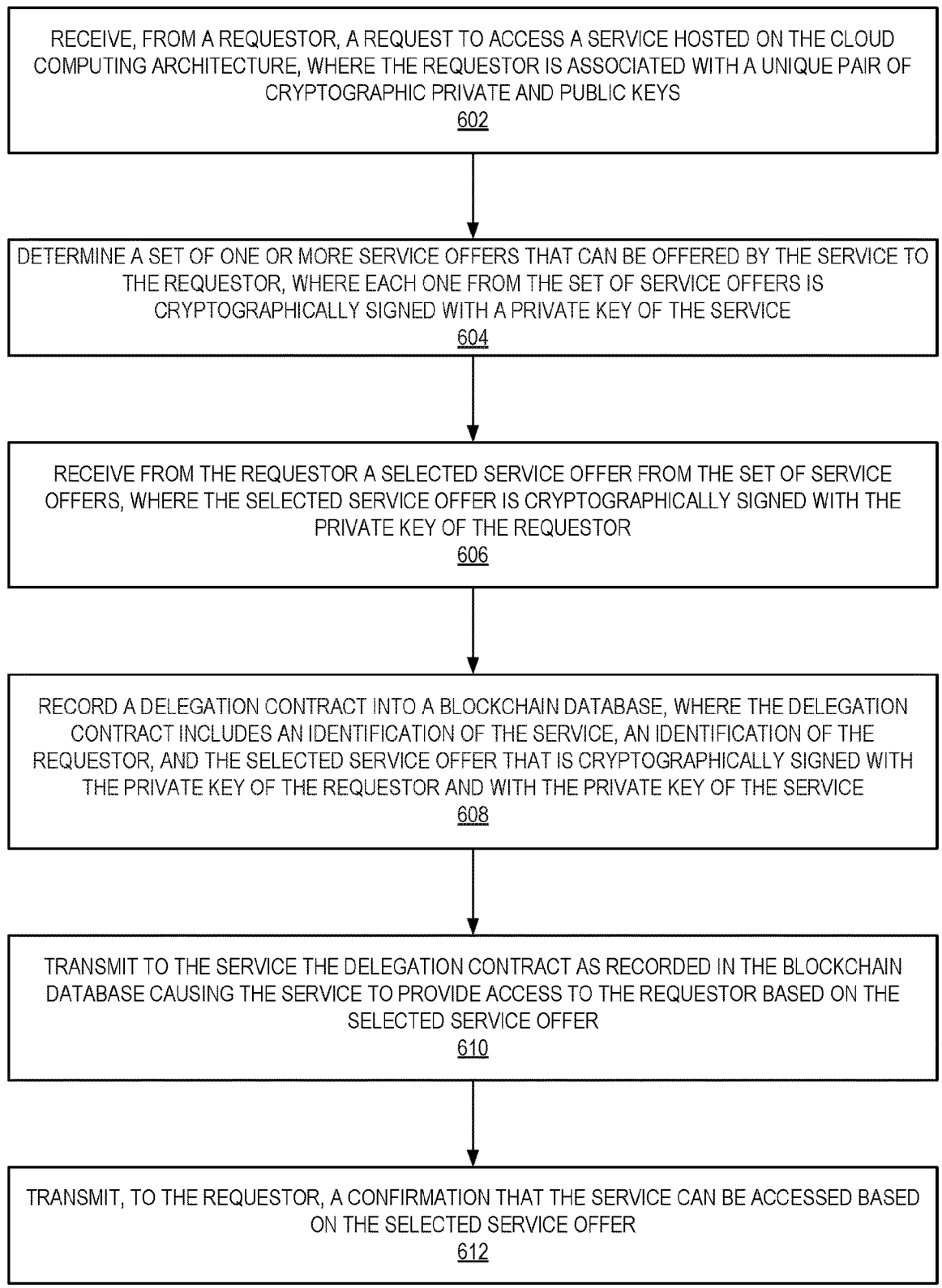
FIG. 6 illustrates a flow diagram of exemplary operations performed for enabling service access authorization in accordance with some embodiments.

FIG. 6 illustrates a flow diagram of exemplary operations performed for enabling service access authorization in accordance with some embodiments. In some embodiments, the operations of FIG. 6 can be performed by a service access authorization manager (e.g., 112) that is part of the management system of a cloud computing infrastructure. In other embodiments, the operations can be performed by any management system that is operative to generate and manage access rights between two entities. At operation 602, the service access authorization manager 112 receives, from a requestor, a request to access a service hosted on the data center. The requestor is associated with a unique pair of cryptographic private and public keys. At operation 604, the service access authorization manager 112 determines a set of one or more service offers that can be offered by the service to the requestor. Each one of the service offers is cryptographically signed with a private key of the service. In some embodiments, each of the service offers can be structured as described with the exemplary service offer of FIG. 3. In other embodiments, different structures/implementations can be used to define the attributes of the service offers.

At operation 606, the service access authorization manager 112 receives from the requestor a selected service offer from the set of service offers. The selected service offer is cryptographically signed with the private key of the requestor.

Flow then moves to operation 608, at which the service access authorization manager 112 records a delegation contract into a blockchain database. The delegation contract includes an identification of the service, an identification of the requestor, and the selected service offer that is cryptographically signed with the private key of the requestor. In some embodiments, the delegation contract is generated based on the structure described with reference to FIG. 4. Other exemplary structures can be used without departing from the scope of the present invention.

At operation 610, the service access authorization manager 112 transmits to the service the delegation contract as recorded in the blockchain database causing the service to provide access to the requestor based on the selected service offer.

At operation 612, the service access authorization manager 112 transmits, to the requestor, a confirmation that the service can be accessed based on the selected service offer. At operation and FIG. 7 illustrates a flow diagram of exemplary operations that can be performed by a service in accordance with some embodiments. In some embodiments, the operations of FIG. 7 are performed by a service 110A that is hosted in a data center. In other embodiments, other infrastructures may host the service and perform the operations of FIG. 7. At operation 702, the service receives a request from a requestor for accessing the service, where the request includes a token determined at least in part based on a service offer signed with the private key of the service and with the private key of the requestor. The service offer was agreed upon by the requestor and the service through a mechanism as described with respect to FIGS. 2A-B and FIG. 6. For example, the token is a JWT including a signature of the service offer, where the service offer has been signed with both a private key of the requestor and a private key of the service. At operation 704, the service determines that the token is valid indicating that the requestor is authorized to access the service. At operation 706, the service grants access to the requestor.

Figure 8:
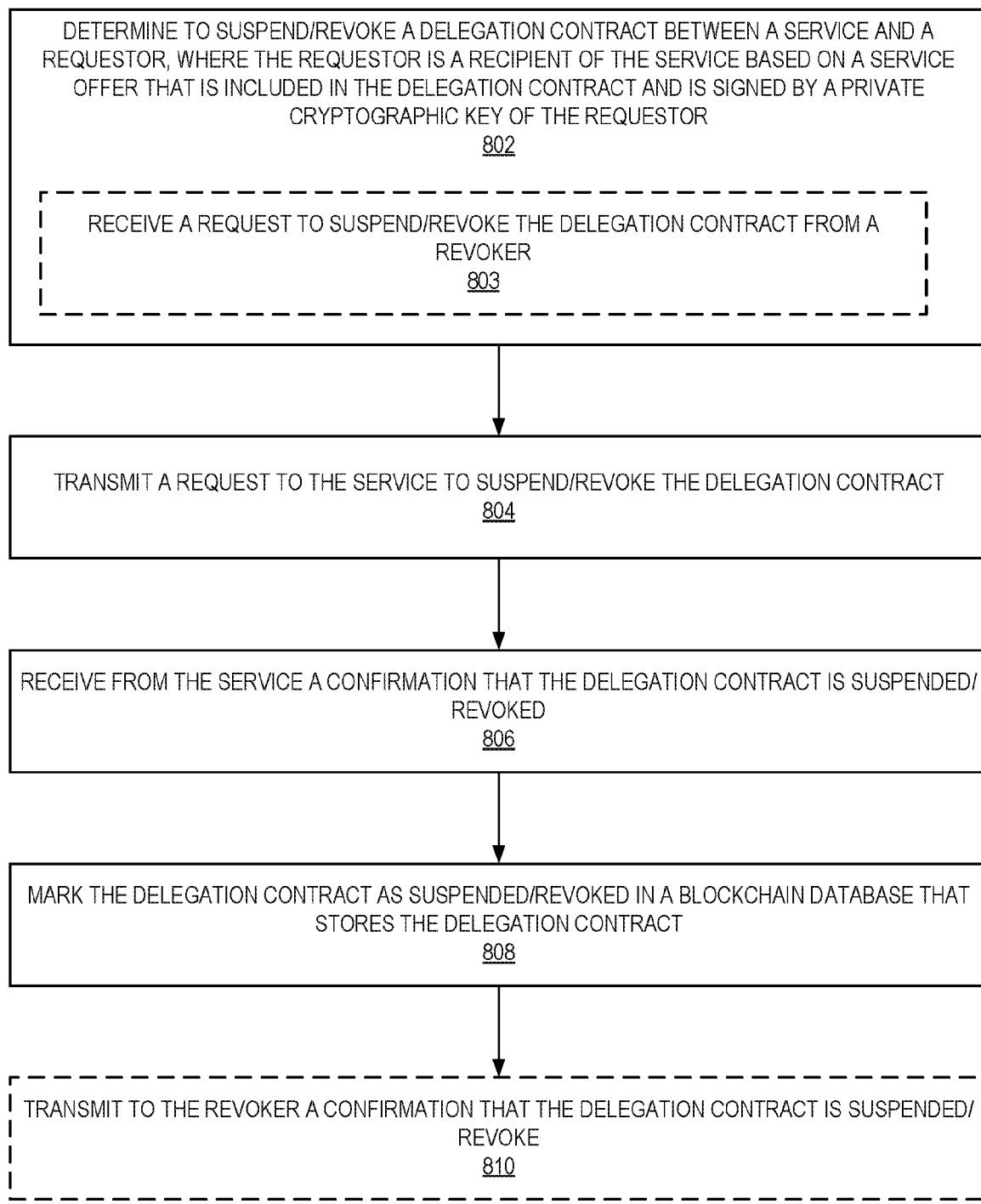
FIG. 8 illustrates a flow diagram of exemplary operations for revoking or suspending a delegation contract between a service and a requestor, in accordance with some embodiment.

FIG. 8 illustrates a flow diagram of exemplary operations for revoking or suspending a delegation contract between a service and a requestor, in accordance with some embodiment. At operation 802, the service access authorization manager 112 determines to suspend or revoke a delegation contract between a service and a requestor, where the requestor is a recipient of the service based on a service offer that is included in the delegation contract and is signed by a private cryptographic key of the requestor. At operation 803, the service access authorization manager 112 the determination to suspend or revoke the delegation contract is performed as a result of the receipt of a request to suspend or revoke the delegation contract from a revoker. At operation 804, the service access authorization manager 112 transmits a request to the service to suspend/revoke the delegation contract. At operation 806, the service access authorization manager 112 receives from the service a confirmation that the delegation contract is suspended/revoked. At operation 808, the service access authorization manager 112 marks the delegation contract as suspended or revoked in a blockchain database that stores the delegation contract. In the embodiments, where the request to revoke/suspend is received from a revoker, the service access authorization manager 112 may transmit, at operation 810, to the revoker a confirmation that the delegation contract is suspended/revoke.

The methods and apparatuses described herein allow for the use of service access authentication techniques based on smart contract infrastructures that enable the creation and recordation of a delegation contract between a requestor of a service and the service that is provided. These techniques allow for increased scalability and resilience, and enable the participation of multiple parties (e.g., the cloud infrastructure, the service providers built on top of the cloud infrastructure, tenants (e.g., organizations) and sub-tenants (e.g., employees, customers) in complex business ecosystems. Further authentication of the terms of the contract is enabled by having both parties sign the service offer with their private cryptographic key. The embodiments herein provide a significant advantage over other technique where a centralized database can store access information by relying on the immutable aspect of the blockchain database storing the contract Immutability of the delegation contracts means that in case of a dispute, the blockchain database can be audited by a third party to determine what actually happened and what was agreed upon between the requestor and the service at the time of the service being requested. Regulators, auditors, and mediators can be given permission for read-only access to the blockchain database in order to monitor and audit the activity. Industries which are heavily regulated, like financial services and health care, especially benefit from such an immutable system. In addition, blockchains are particularly well suited to cases where multiple parties form a business ecosystem in which they cooperate in some cases and compete in others. In some embodiments, the service access authentication manager is run by the cloud provider as part of the cloud management system. While the embodiments were described with reference to a service access authentication manager being part of the management system of the data center, other entities may use the techniques described herein to generate and store delegation contracts between a service and a requestor in a blockchain database.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, solid state drives, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors (e.g., wherein a processor is a microprocessor, controller, microcontroller, central processing unit, digital signal processor, application specific integrated circuit, field programmable gate array, other electronic circuitry, a combination of one or more of the preceding) coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) (NI(s)) to establish network connections (to transmit and/or receive code and/or data using propagating signals) with other electronic devices. For example, the set of physical NIs (or the set of physical NI(s) in combination with the set of processors executing code) may perform any formatting, coding, or translating to allow the electronic device to send and receive data whether over a wired and/or a wireless connection. In some embodiments, a physical NI may comprise radio circuitry capable of receiving data from other electronic devices over a wireless connection and/or sending data out to other devices via a wireless connection. This radio circuitry may include transmitter(s), receiver(s), and/or transceiver(s) suitable for radiofrequency communication. The radio circuitry may convert digital data into a radio signal having the appropriate parameters (e.g., frequency, timing, channel, bandwidth, etc.). The radio signal may then be transmitted via antennas to the appropriate recipient(s). In some embodiments, the set of physical NI(s) may comprise network interface controller(s) (NICs), also known as a network interface card, network adapter, or local area network (LAN) adapter. The NIC(s) may facilitate in connecting the electronic device to other electronic devices allowing them to communicate via wire through plugging in a cable to a physical port connected to a NIC. One or more parts of an embodiment of the invention may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video, etc.). In the embodiments described above the components of the system 100 can be implemented on one or more network devices coupled in a network. For example, each of the services, the service access authorization manager 112, the tenant authentication manager 114, and the blockchain platform 118 can be implemented on one ND or distributed over multiple ND of the data center 108. Similarly, the tenants 102A-N may be abstract organization for which access to the service is enabled through the use of one or more network devices to access the resources and services of the data center 108.

Figures 9A, 9B:
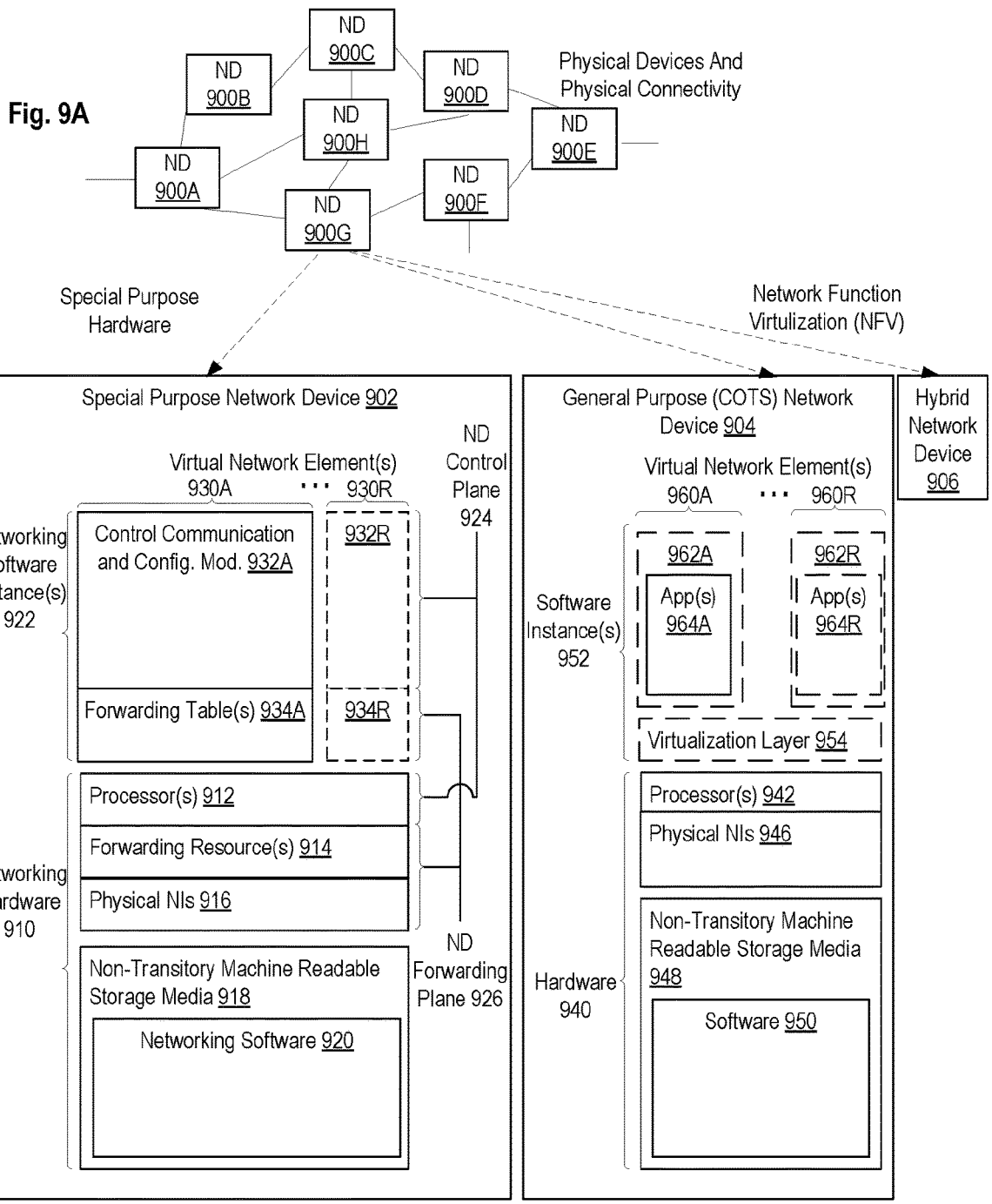
FIG. 9A illustrates connectivity between network devices (NDs) within an exemplary network, as well as three exemplary implementations of the NDs, according to some embodiments of the invention.
FIG. 9B illustrates an exemplary way to implement a special-purpose network device according to some embodiments of the invention.

FIG. 9A illustrates connectivity between network devices (NDs) within an exemplary network, as well as three exemplary implementations of the NDs, according to some embodiments of the invention. FIG. 9A shows NDs 900A-H, and their connectivity by way of lines between 900A-900B, 900B-900C, 900C-900D, 900D-900E, 900E-900F, 900F-900G, and 900A-900G, as well as between 900H and each of 900A, 900C, 900D, and 900G. These NDs are physical devices, and the connectivity between these NDs can be wireless or wired (often referred to as a link). An additional line extending from NDs 900A, 900E, and 900F illustrates that these NDs act as ingress and egress points for the network (and thus, these NDs are sometimes referred to as edge NDs; while the other NDs may be called core NDs).

Two of the exemplary ND implementations in FIG. 9A are: 1) a special-purpose network device 902 that uses custom application-specific integrated-circuits (ASICs) and a special-purpose operating system (OS); and 2) a general purpose network device 904 that uses common off-the-shelf (COTS) processors and a standard OS.

The special-purpose network device 902 includes networking hardware 910 comprising a set of one or more processor(s) 912, forwarding resource(s) 914 (which typically include one or more ASICs and/or network processors), and physical network interfaces (NIs) 916 (through which network connections are made, such as those shown by the connectivity between NDs 900A-H), as well as non-transitory machine readable storage media 918 having stored therein networking software 920. During operation, the networking software 920 may be executed by the networking hardware 910 to instantiate a set of one or more networking software instance(s) 922. Each of the networking software instance(s) 922, and that part of the networking hardware 910 that executes that network software instance (be it hardware dedicated to that networking software instance and/or time slices of hardware temporally shared by that networking software instance with others of the networking software instance(s) 922), form a separate virtual network element 930A-R. Each of the virtual network element(s) (VNEs) 930A-R includes a control communication and configuration module 932A-R (sometimes referred to as a local control module or control communication module) and forwarding table(s) 934A-R, such that a given virtual network element (e.g., 930A) includes the control communication and configuration module (e.g., 932A), a set of one or more forwarding table(s) (e.g., 934A), and that portion of the networking hardware 910 that executes the virtual network element (e.g., 930A).

The special-purpose network device 902 is often physically and/or logically considered to include: 1) a ND control plane 924 (sometimes referred to as a control plane) comprising the processor(s) 912 that execute the control communication and configuration module(s) 932A-R; and 2) a ND forwarding plane 926 (sometimes referred to as a forwarding plane, a data plane, or a media plane) comprising the forwarding resource(s) 914 that utilize the forwarding table(s) 934A-R and the physical NIs 916. By way of example, where the ND is a router (or is implementing routing functionality), the ND control plane 924 (the processor(s) 912 executing the control communication and configuration module(s) 932A-R) is typically responsible for participating in controlling how data (e.g., packets) is to be routed (e.g., the next hop for the data and the outgoing physical NI for that data) and storing that routing information in the forwarding table(s) 934A-R, and the ND forwarding plane 926 is responsible for receiving that data on the physical NIs 916 and forwarding that data out the appropriate ones of the physical NIs 916 based on the forwarding table(s) 934A-R.

FIG. 9B illustrates an exemplary way to implement the special-purpose network device 902 according to some embodiments of the invention. FIG. 9B shows a special-purpose network device including cards 938 (typically hot pluggable). While in some embodiments the cards 938 are of two types (one or more that operate as the ND forwarding plane 926 (sometimes called line cards), and one or more that operate to implement the ND control plane 924 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec), Secure Sockets Layer (SSL)/ Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 936 (e.g., a first full mesh coupling the line cards and a second full mesh coupling all of the cards).

Returning to FIG. 9A, the general purpose network device 904 includes hardware 940 comprising a set of one or more processor(s) 942 (which are often COTS processors) and physical NIs 946, as well as non-transitory machine readable storage media 948 having stored therein software 950. During operation, the processor(s) 942 execute the software 950 to instantiate one or more sets of one or more applications 964A-R. While one embodiment does not implement virtualization, alternative embodiments may use different forms of virtualization. For example, in one such alternative embodiment the virtualization layer 954 represents the kernel of an operating system (or a shim executing on a base operating system) that allows for the creation of multiple instances 962A-R called software containers that may each be used to execute one (or more) of the sets of applications 964A-R; where the multiple software containers (also called virtualization engines, virtual private servers, or jails) are user spaces (typically a virtual memory space) that are separate from each other and separate from the kernel space in which the operating system is run; and where the set of applications running in a given user space, unless explicitly allowed, cannot access the memory of the other processes. In another such alternative embodiment the virtualization layer 954 represents a hypervisor (sometimes referred to as a virtual machine monitor (VMM)) or a hypervisor executing on top of a host operating system, and each of the sets of applications 964A-R is run on top of a guest operating system within an instance 962A-R called a virtual machine (which may in some cases be considered a tightly isolated form of software container) that is run on top of the hypervisor—the guest operating system and application may not know they are running on a virtual machine as opposed to running on a "bare metal" host electronic device, or through para-virtualization the operating system and/or application may be aware of the presence of virtualization for optimization purposes. In yet other alternative embodiments, one, some or all of the applications are implemented as unikernel(s), which can be generated by compiling directly with an application only a limited set of libraries (e.g., from a library operating system (LibOS) including drivers/libraries of OS services) that provide the particular OS services needed by the application. As a unikernel can be implemented to run directly on hardware 940, directly on a hypervisor (in which case the unikernel is sometimes described as running within a LibOS virtual machine), or in a software container, embodiments can be implemented fully with unikernels running directly on a hypervisor represented by virtualization layer 954, unikernels running within software containers represented by instances 962A-R, or as a combination of unikernels and the above-described techniques (e.g., unikernels and virtual machines both run directly on a hypervisor, unikernels and sets of applications that are run in different software containers).

The instantiation of the one or more sets of one or more applications 964A-R, as well as virtualization if implemented, are collectively referred to as software instance(s) 952. Each set of applications 964A-R, corresponding virtualization construct (e.g., instance 962A-R) if implemented, and that part of the hardware 940 that executes them (be it hardware dedicated to that execution and/or time slices of hardware temporally shared), forms a separate virtual network element(s) 960A-R.

The virtual network element(s) 960A-R perform similar functionality to the virtual network element(s) 930A-R—e.g., similar to the control communication and configuration module(s) 932A and forwarding table(s) 934A (this virtualization of the hardware 940 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). While embodiments of the invention are illustrated with each instance 962A-R corresponding to one VNE 960A-R, alternative embodiments may implement this correspondence at a finer level granularity (e.g., line card virtual machines virtualize line cards, control card virtual machine virtualize control cards, etc.); it should be understood that the techniques described herein with reference to a correspondence of instances 962A-R to VNEs also apply to embodiments where such a finer level of granularity and/or unikernels are used.

In certain embodiments, the virtualization layer 954 includes a virtual switch that provides similar forwarding services as a physical Ethernet switch. Specifically, this virtual switch forwards traffic between instances 962A-R and the physical NI(s) 946, as well as optionally between the instances 962A-R; in addition, this virtual switch may enforce network isolation between the VNEs 960A-R that by policy are not permitted to communicate with each other (e.g., by honoring virtual local area networks (VLANs)).

The third exemplary ND implementation in FIG. 9A is a hybrid network device 906, which includes both custom ASICs/special-purpose OS and COTS processors/standard OS in a single ND or a single card within an ND. In certain embodiments of such a hybrid network device, a platform VM (i.e., a VM that that implements the functionality of the special-purpose network device 902) could provide for para-virtualization to the networking hardware present in the hybrid network device 906.

For example, while the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method in a server of a data center of enabling service access authorization, the method comprising:

receiving, from a requestor, a request to access a service hosted in the data center, wherein the requestor is associated with a unique pair of cryptographic private and public keys;

determining a set of one or more service offers that can be offered by the service to the requestor, wherein each one from the set of service offers is cryptographically signed with a private key of the service;

receiving from the requestor a selected service offer from the set of service offers, wherein the selected service offer is cryptographically signed with the private key of the requestor;

recording a delegation contract into a blockchain database, wherein the delegation contract includes an identification of the service, an identification of the requestor, and the selected service offer that is cryptographically signed with the private key of the requestor and with the private key of the service;

transmitting to the service the delegation contract as recorded in the blockchain database causing the service to provide access to the requestor based on the selected service offer; and transmitting, to the requestor, a confirmation that the service can be accessed based on the selected service offer.

2. The method of claim 1, wherein the identification of the service is a public key of a unique pair of cryptographic private and public keys associated with the service, and the identification of the requestor is the public key of the requestor.

3. The method of claim 1, wherein the delegation contract further includes at least one of a set of one or more first identifiers uniquely identifying a set of one or more sub-delegates to which the selected service offer can be delegated by the requestor, one or more quotas specifying the maximum amount of the service attributes that can be consumed by the requestor, a set of one or more second identifiers that uniquely identify a set of one or more entities that are allowed to revoke the delegation contract set between the requestor and the service, an expiration time indicating a time and date after which access of the requestor to the service is no longer valid, and a time of issue indicating the time and date at which the delegation contract was generated.

4. The method of claim 1, wherein the requestor is at least one of a tenant of a cloud-computing infrastructure or a service offered at the cloud-computing infrastructure.

5. The method of claim 1, wherein the service is offered by at least one of a provider of the data center and a third party provider that is different from the requestor and the provider of the data center.

6. The method of claim 1, wherein the determining the set of one or more service offers that can be offered to the requestor by the service includes:
retrieving from a cache the set of one or more service offers, wherein the set of service offers were obtained from the service and are signed with a private key of the service.

7. The method of claim 1, wherein the determining the set of one or more service offers that can be offered to the requestor by the service is based at least in part on a type of the requestor.

8. A server in a data center for enabling service access authorization, the server comprising:
a non-transitory computer readable storage medium to store instructions; and
a processor coupled with the non-transitory computer readable storage medium to process the stored instructions to:
receive, from a requestor, a request to access a service hosted in the data center, wherein the requestor is associated with a unique pair of cryptographic private and public keys,
determine a set of one or more service offers that can be offered by the service to the requestor, wherein each one from the set of service offers is cryptographically signed with a private key of the service,
receive from the requestor a selected service offer from the set of service offers, wherein the selected service offer is cryptographically signed with the private key of the requestor,
record a delegation contract into a blockchain database, wherein the delegation contract includes an identification of the service, an identification of the requestor, and the selected service offer that is cryptographically signed with the private key of the requestor and with the private key of the service,
transmit to the service the delegation contract as recorded in the blockchain database causing the service to provide access to the requestor based on the selected service offer transmit, and
to the requestor, a confirmation that the service can be accessed based on the selected service offer.

9. The server of claim 8, wherein the identification of the service is a public key of from a unique pair of cryptographic private and public keys associated with the service, and the identification of the requestor is the public key of the requestor.

10. The server of claim 8, wherein the delegation contract further includes at least one of a set of one or more first identifiers uniquely identifying a set of one or more sub-delegates to which the selected service offer can be delegated by the requestor, one or more quotas specifying the maximum amount of the service attributes that can be consumed by the requestor, a set of one or more second identifiers that uniquely identify a set of one or more entities that are allowed to revoke the delegation contract set between the requestor and the service, an expiration time indicating a time and date after which access of the requestor to the service is no longer valid, and a time of issue indicating the time and date at which the delegation contract was generated.

11. The server of claim 8, wherein the requestor is at least one of a tenant of a cloud-computing infrastructure or a service offered at the cloud-computing infrastructure.

12. The server of claim 8, wherein the service is offered by at least one of a provider of the data center and a third party provider that is different from the requestor and the provider of the data center.

13. The server of claim 8, wherein to determine the set of one or more service offers that can be offered to the requestor by the service includes:
retrieving from a cache the set of one or more service offers, wherein the set of service offers were obtained from the service and are signed with a private key of the service.

14. The server of claim 8, wherein to determine the set of one or more service offers that can be offered to the requestor by the service is based at least in part on a type of the requestor.

15. A non-transitory machine-readable storage medium that provides instructions that, if executed by a processor a server of a data center, will cause said processor to perform operations comprising:
- receiving, from a requestor, a request to access a service hosted in the data center, wherein the requestor is associated with a unique pair of cryptographic private and public keys;
- determining a set of one or more service offers that can be offered by the service to the requestor, wherein each one from the set of service offers is cryptographically signed with a private key of the service;
- receiving from the requestor a selected service offer from the set of service offers, wherein the selected service offer is cryptographically signed with the private key of the requestor;
- recording a delegation contract into a blockchain database, wherein the delegation contract includes an identification of the service, an identification of the requestor, and the selected service offer that is cryptographically signed with the private key of the requestor and with the private key of the service;
- transmitting to the service the delegation contract as recorded in the blockchain database causing the service to provide access to the requestor based on the selected service offer; and
- transmitting, to the requestor, a confirmation that the service can be accessed based on the selected service offer.

16. The non-transitory machine-readable storage medium of claim 15, wherein the identification of the service is a public key of a unique pair of cryptographic private and public keys associated with the service, and the identification of the requestor is the public key of the requestor.

17. The non-transitory machine-readable storage medium of claim 15, wherein the delegation contract further includes at least one of a set of one or more first identifiers uniquely identifying a set of one or more sub-delegates to which the selected service offer can be delegated by the requestor, one or more quotas specifying the maximum amount of the service attributes that can be consumed by the requestor, a set of one or more second identifiers that uniquely identify a set of one or more entities that are allowed to revoke the delegation contract set between the requestor and the service, an expiration time indicating a time and date after which access of the requestor to the service is no longer valid, and a time of issue indicating the time and date at which the delegation contract was generated.

18. The non-transitory machine-readable storage medium of claim 15, wherein the requestor is at least one of a tenant of a cloud-computing infrastructure or a service offered at the cloud-computing infrastructure.

19. The non-transitory machine-readable storage medium of claim 15, wherein the service is offered by at least one of a provider of the data center and a third party provider that is different from the requestor and the provider of the data center.

20. The non-transitory machine-readable storage medium of claim 15, wherein the determining the set of one or more service offers that can be offered to the requestor by the service includes:
- retrieving from a cache the set of one or more service offers, wherein the set of service offers were obtained from the service and are signed with a private key of the service.

21. The non-transitory machine-readable storage medium of claim 15, wherein the determining the set of one or more service offers that can be offered to the requestor by the service is based at least in part on a type of the requestor.

* * * * *